(12) United States Patent
Steuer

(10) Patent No.: US 10,760,891 B2
(45) Date of Patent: Sep. 1, 2020

(54) SURFACE MEASURING APPARATUS

(71) Applicant: JENOPTIK Industrial Metrology Germany GmbH, Villingen-Schwenningen (DE)

(72) Inventor: Philipp Steuer, Trossingen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 357 days.

(21) Appl. No.: 15/936,851

(22) Filed: Mar. 27, 2018

(65) Prior Publication Data

US 2019/0101371 A1 Apr. 4, 2019

(30) Foreign Application Priority Data

Mar. 29, 2017 (DE) .................. 10 2017 106 741

(51) Int. Cl.
| | |
|---|---|
| G01B 5/20 | (2006.01) |
| G01B 5/008 | (2006.01) |
| G01B 21/04 | (2006.01) |
| G01B 5/28 | (2006.01) |
| G01B 5/012 | (2006.01) |

(52) U.S. Cl.
CPC .............. G01B 5/20 (2013.01); G01B 5/008 (2013.01); G01B 5/012 (2013.01); G01B 5/28 (2013.01); G01B 21/042 (2013.01); G01B 21/047 (2013.01)

(58) Field of Classification Search
CPC .................. G01B 5/20; G01B 5/008

USPC ............................ 33/501.04, 503
See application file for complete search history.

(56) References Cited

U.S. PATENT DOCUMENTS

| | | | | |
|---|---|---|---|---|
| 6,073,360 | A * | 6/2000 | Struble | ............ G01B 5/14 33/783 |
| 7,055,367 | B2 * | 6/2006 | Hajdukiewicz | ...... G01B 21/042 33/501.02 |
| 8,006,398 | B2 * | 8/2011 | McFarland | .......... G05B 19/401 33/503 |
| 8,334,971 | B2 | 12/2012 | Keller et al. | |
| 8,336,224 | B2 | 12/2012 | Arnold | |
| 8,429,829 | B2 | 4/2013 | Arnold | |
| 8,508,743 | B2 | 8/2013 | Keller et al. | |
| 8,725,446 | B2 | 5/2014 | Wegmann | |
| 8,973,280 | B2 | 3/2015 | Seewig | |

(Continued)

*Primary Examiner* — George B Bennett
(74) *Attorney, Agent, or Firm* — Shlesinger, Arkwright & Garvey LLP

(57) ABSTRACT

Surface measuring apparatus for measuring a surface of a workpiece has a probe including a probe arm bearing a probe element for contacting workpiece surface to be measured. Surface measuring apparatus also has a feed apparatus for moving probe element relative to workpiece to be measured. Probe arm is detachably connectable or connected to a movable part of feed apparatus via a mechanical interface having a first part and a second part, which in installed position of probe arm are connected to one another with static determinacy on movable part of feed apparatus, and one of the parts is associated with probe arm and the other part is associated with feed apparatus. At least one alignment protrusion is on first part as an installation alignment aid, which in installed position of probe arm contactlessly or essentially contactlessly engages in an alignment recess formed on second part.

13 Claims, 7 Drawing Sheets

(56) References Cited

U.S. PATENT DOCUMENTS

| | | | |
|---|---|---|---|
| 9,261,359 B2 | 2/2016 | DeCool | |
| 9,393,663 B2 | 7/2016 | Volk | |
| 9,395,310 B2 | 7/2016 | Rudolf | |
| 9,562,756 B2 | 2/2017 | Seewig | |
| 9,683,914 B2 | 6/2017 | Dietz et al. | |
| 9,816,811 B2 | 11/2017 | Riester | |
| 9,879,969 B2 | 1/2018 | Volk | |
| 9,983,149 B2 | 5/2018 | Rudolf | |
| 10,330,915 B2* | 6/2019 | Rudolf | G02B 7/06 |
| 2004/0231177 A1* | 11/2004 | Mies | G01B 5/004 |
| | | | 33/503 |
| 2008/0148590 A1* | 6/2008 | Hayashi | G01B 11/24 |
| | | | 33/710 |
| 2013/0047452 A1* | 2/2013 | McMurtry | G01B 5/012 |
| | | | 33/503 |
| 2014/0208877 A1* | 7/2014 | Speck | G01B 21/047 |
| | | | 73/866.5 |
| 2016/0153767 A1* | 6/2016 | Ihlenfeldt | G01C 3/08 |
| | | | 33/503 |
| 2019/0077076 A1* | 3/2019 | O'Hare | G01B 5/0007 |
| 2019/0249975 A1* | 8/2019 | Steuer | G01B 5/016 |

* cited by examiner

SURFACE MEASURING APPARATUS

CROSS-REFERENCE TO RELATED APPLICATIONS

This application claims the priority of German Application No. 10 2017 106 741.8, filed Mar. 29, 2017, and which is incorporated herein by reference.

FIELD OF THE INVENTION

The invention relates to a surface measuring apparatus.

BACKGROUND OF THE INVENTION

Surface measuring apparatuses of this type are generally known, for example in the form of roughness measurement apparatuses. They have a probe that includes a probe arm bearing a probe element for contacting a surface of a workpiece to be measured. The known surface measuring apparatuses also have a feed apparatus for moving the probe element relative to the workpiece to be measured. The probe arm is exchangeable to allow the surface measuring apparatus to be adapted to different measuring tasks. For this purpose, the probe arm is detachably connectable or connected to a movable part of the feed apparatus via a mechanical interface, the interface having a first part and a second part which in the installed position of the probe arm are connected to one another with static determinacy on the movable part of the feed apparatus, one part being associated with the probe arm and the other part being associated with the feed apparatus.

The surface measuring apparatus may thus be adapted to different measuring tasks by the selection and use of an appropriate probe arm.

When the probe arm is exchanged, it must be mounted in a predetermined, defined position on the movable part of the feed apparatus. Otherwise, the actual geometry of the probe would depart, in an undefined manner, from a predetermined geometry on which the evaluation of the probe output signals is based. However, reliable reconstruction of the surface of the workpiece to be measured, based on the probe output signals, is possible only when the geometry of the probe is precisely known.

There is a risk in particular that a slight deviation of the actual position of the probe arm from the predetermined position may result in impairment of the measuring accuracy without this error being noticed. The risk of an incorrect installation of the probe arm is further increased due to the fact that the probe arm is frequently held on the movable part of the feed apparatus by magnetic force, and in principle, installation of the probe arm in various positions on the movable part of the feed apparatus is thus possible.

To simplify installation of the probe arm in the intended correct position, it is known to use alignment aids in the form of visual markings. However, it is disadvantageous that the interface is often not visible. In addition, in particular for small components, a slight misalignment is often not recognizable.

OBJECTS AND SUMMARY OF THE INVENTION

An object of the invention is to provide a surface measuring apparatus, in which the installation of the probe arm in the intended position on the movable part of the feed apparatus is simplified.

This object is achieved by the invention set forth herein.

The invention provides that at least one alignment protrusion is provided on the first part as an installation alignment aid, which in the installed position of the probe arm contactlessly or essentially contactlessly engages in an alignment recess that is formed on the second part.

The combination of the alignment protrusion and the alignment recess provided according to the invention simplifies installation of the probe arm in the intended position, in that the probe arm is guided into this position during installation. This reduces the risk of an incorrect installation of the probe arm during exchange of a probe arm, thus reliably avoiding measuring inaccuracies caused thereby.

One advantage of the invention over visual markings as an installation alignment aid is that the installation alignment aid according to the invention acts even when the interface cannot be seen.

Another advantage of the invention is that providing one alignment protrusion or multiple alignment protrusions with associated alignment recesses does not appreciably increase the manufacturing costs for the surface measuring apparatus according to the invention. The functional reliability of the surface measuring apparatus is thus increased using simple and economical means.

As a result of the alignment protrusion contactlessly or essentially contactlessly engaging in the associated alignment recess in the installed position of the probe arm, the installation alignment aid acts only during installation of the probe arm. According to the invention, an approximately contactless engagement of the alignment protrusion in the alignment recess is understood to mean that the alignment protrusion in the installed position of the probe arm does not impair the static determinacy of the connection of the first part to the second part.

The shape, size, and number of the alignment protrusions and associated alignment recesses are selectable within wide limits, depending on the particular requirements.

One advantageous further embodiment of the invention provides that the installation alignment aid is designed in such a way that an alignment of the probe arm with respect to its longitudinal center plane is achieved during installation of the probe arm. In this way, precentering with respect to the longitudinal center plane of the probe arm takes place during the installation of the probe arm.

In order to establish a statically determinate connection between the first part and the second part in the installed position of the probe arm, using simple means, one advantageous further embodiment of the invention provides that the first part and the second part are connected to one another in the installed position of the probe arm via a three-point support.

One advantageous further embodiment of the above embodiment provides that in the installed position of the probe arm, the three-point support is formed on mutually facing surfaces of the first and second parts, and on one of the parts has three support protrusions, which in the installed position of the probe arm make engaging contact with support recesses, having an essentially complementary shape, that are formed on the other part.

In the above embodiments, the or each support protrusion may be designed in one piece with the associated first or second part. However, it is also possible, and advantageous in terms of simplifying the manufacture, to design at least one support protrusion as a separate component. In this regard, one advantageous further embodiment of the invention provides that at least one support protrusion is formed by a ball. Such balls may be manufactured at low cost and with high precision, and at the same time allow highly precise positioning of the probe arm relative to the movable part of the feed apparatus in the installed position of the probe arm.

To simplify alignment of the probe arm with respect to its longitudinal center plane, one advantageous further embodiment of the invention provides that at least one alignment protrusion is situated in the longitudinal center plane of the first or second part.

One extremely advantageous further embodiment of the invention provides that at least two alignment protrusions, spaced apart from one another in the longitudinal direction of the probe arm, are provided. The precentering of the probe arm with respect to its longitudinal center plane is further improved in this way.

Another advantageous further embodiment of the invention provides that at least one alignment protrusion projects farther beyond the associated surface of the first part or second part than do the support protrusions, in such a way that as the first part approaches the second part during the installation of the probe arm, the alignment protrusion comes into engagement with the associated alignment recess before the support protrusions come into engagement with the associated support recesses. In this embodiment, the alignment protrusion or the alignment protrusions thus come(s) into engagement first during the installation of the probe arm, thus ensuring that the probe arm moves into the correct position. The support protrusions subsequently come into engagement with the associated support recesses, so that the first part and the second part may then be connected to one another with static determinacy in the desired and required manner.

Another advantageous further embodiment of the invention provides that at least one alignment protrusion is designed as an alignment ball, and at least one support protrusion is designed as a support ball, and that the diameter of the or each alignment ball is larger than the diameter of the or each support ball. In this way, during the installation of the probe arm, initially the alignment ball or the alignment balls come(s) into engagement, and only then do the support balls come into engagement.

In principle, the support protrusions may be situated on the part (first part or second part) associated with the probe arm, and the support recesses may be situated on the other part (second part or first part). In this regard, one advantageous further embodiment of the invention provides that the first part is situated on the movable part of the feed apparatus, and the second part is situated on the probe arm. In this way, the support protrusions are situated on the movable part of the feed apparatus and the support recesses are situated on the probe arm, so that the alignment protrusions only need to be provided once, namely, on the movable part of the feed apparatus, while the alignment recesses are provided on each of the exchangeable probe arms. The manufacture of the surface measuring apparatus according to the invention with the associated probe arms is thus further simplified, and is thus even more cost-effective.

Another advantageous further embodiment of the invention provides that in the installed position, the probe arm is held on the movable part of the feed apparatus by magnetic force.

According to another advantageous further embodiment, the probe arm in the installed position is held suspended on the movable part of the feed apparatus.

In principle, the surface measuring apparatus according to the invention is suitable for different measuring tasks in surface measurement technology. In this regard, one advantageous further embodiment of the invention provides that the surface measuring apparatus is designed as a roughness measurement apparatus.

The invention is explained in greater detail below with reference to the appended drawings, in which one embodiment of a surface measuring apparatus according to the invention is illustrated. All features described, illustrated in the drawings, and claimed in the patent claims, alone or in any arbitrary suitable combination, constitute the subject matter of the invention, regardless of their recapitulation in the patent claims or their dependencies, and regardless of their description, or illustration in the drawings.

Relative terms such as left, right, up, and down are for convenience only and are not intended to be limiting. The figures show the following:

DETAILED DESCRIPTION OF THE INVENTION

One embodiment of a surface measuring apparatus according to the invention is explained in greater detail below with reference to FIGS. 1 through 7.

Figure 1:
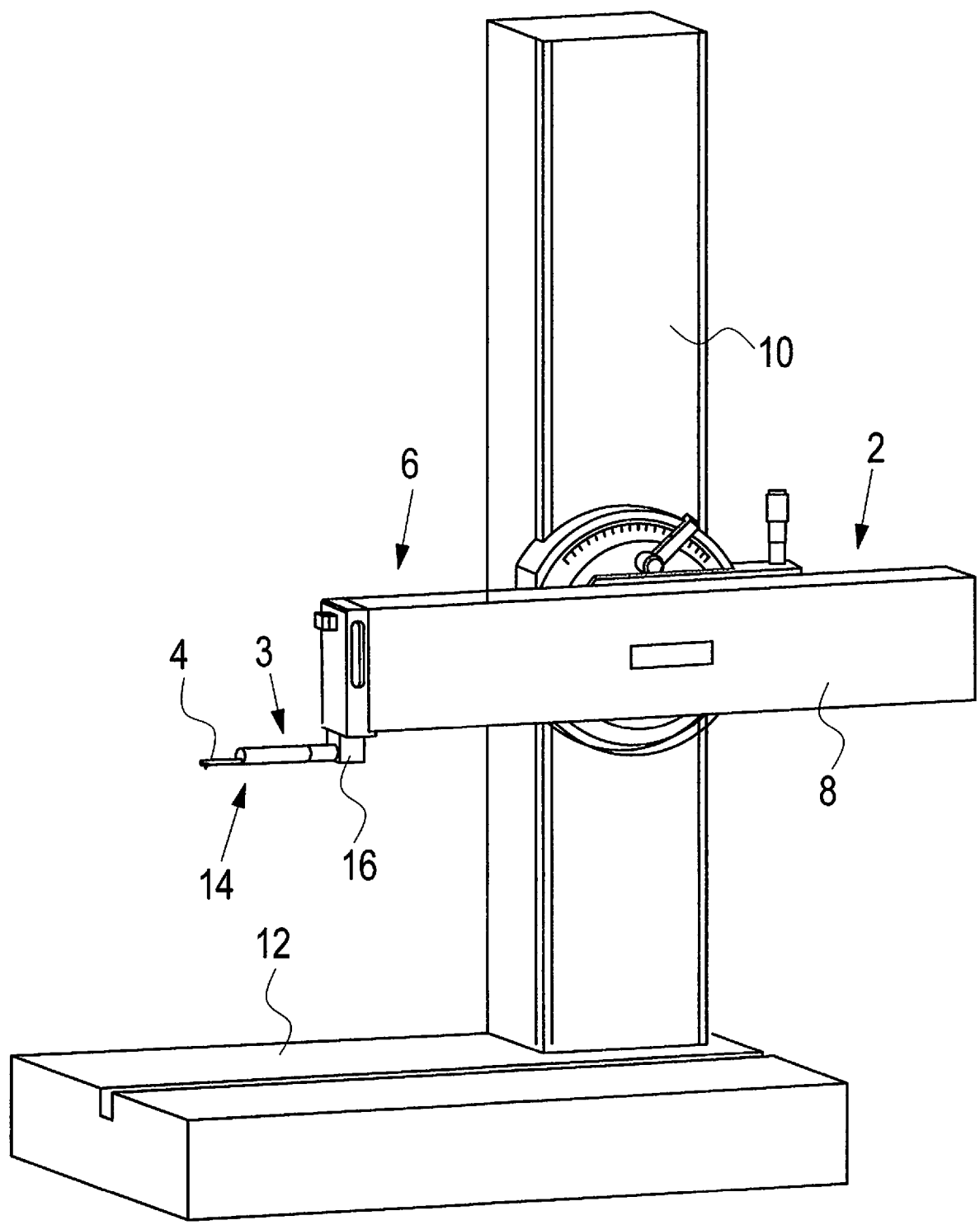
FIG. 1 shows a perspective view of a measuring station according to the invention with an embodiment of a surface measuring apparatus according to the invention in the form of a roughness measurement apparatus.

FIG. 1 illustrates a measuring station with an embodiment of a surface measuring apparatus 2 according to the invention in the form of a roughness measurement apparatus, having a probe 3 with a probe arm 4 that bears a probe element, not discernible in FIG. 1, for contacting a surface of a workpiece to be measured. The surface measuring apparatus 2 has a feed apparatus 6 whose stationary base body 8 is situated in a height- and inclination-adjustable manner on a measuring column 10, which is mounted on a base plate 12. The probe arm 4 is connected to a movable part 16 of the feed apparatus 6 via a mechanical interface 14 (see FIG. 6), which is explained in greater detail below with reference to FIGS. 2 through 5.

During operation of the surface measuring apparatus 2, the movable part 16 of the feed apparatus 6 moves relative to the base body 8, so that a workpiece to be measured is sampled by means of the probe element mounted on the probe arm 4. The basic design of such a surface measuring apparatus, including a probe and feed apparatus, is generally known and therefore is not explained in greater detail.

Figure 2:
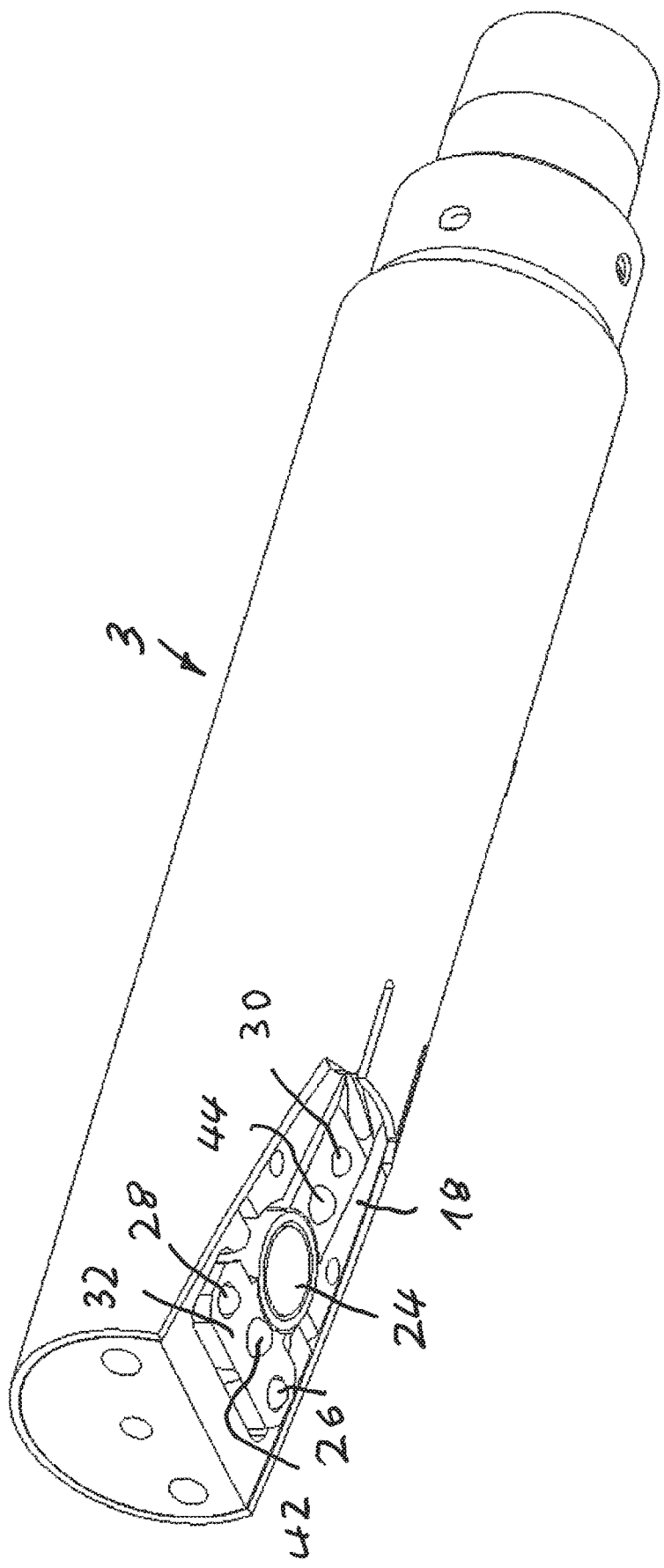
FIG. 2 shows a perspective illustration, in enlarged scale compared to FIG. 1, of a first part of an interface with a movable part of a feed apparatus of the surface measuring apparatus according to FIG. 1, for installation of a probe arm.

FIG. 2 shows a first part 18 of the interface 14, which in this embodiment is connected to the movable part 16 of the feed apparatus 6.

Figure 3:
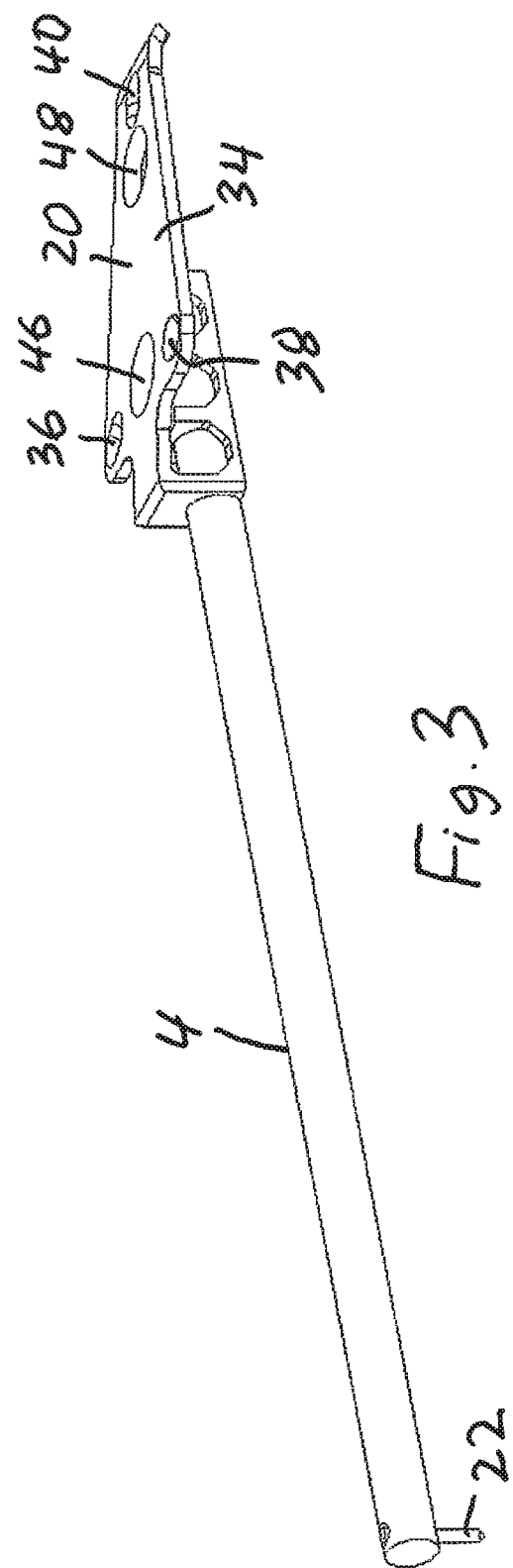
FIG. 3 shows, in the same illustration as in FIG. 2, a probe arm with a second part of the interface.

FIG. 3 shows a second part 20 of the interface 14, which in this embodiment is connected to the probe arm 4, which on its end facing away from the second part 20 bears a probe element 22.

In the installed position of the probe arm 4 on the movable part 16 of the feed apparatus 4 (see FIGS. 6 and 7), the first part 18 and the second part are connected to one another with static determinacy, so that the probe arm 4 is mounted on the movable part 16 of the feed apparatus 6 in the intended defined position.

In the illustrated embodiment, the probe arm 4 in its installed position (see FIGS. 6 and 7) is held suspended on the movable part 8 of the feed apparatus 6, in particular by means of magnetic force in the illustrated embodiment. For this purpose, a magnet 24 is situated on the first part 18, while the second part 20 of the interface 14 is made of a ferromagnetic material.

In the illustrated embodiment, the first part 18 and the second part 20 are connected to one another via a three-point support in the installed position of the probe arm 4. For this purpose, three support protrusions 26, 28, 30 are provided on the first part 18 (see FIG. 2), and in this embodiment are formed by support balls. The support balls 26, 28, 30 are designed as separate precision balls and are inserted into a surface 32 of the first part 18, which in the installed position faces a surface 34 of the second part 20 (see FIG. 3).

Support recesses 36, 38, 40 having a shape that is complementary to the support balls 26, 28, 30 are provided in the surface 34 of the second part 20. The support balls 26, 28, 30 engage in the associated support recesses 36, 38, 40 in the installed position of the probe arm 4, so that the first part 18 and the second part 20 are statically connected to one another, the second part 20 being held to the first part 18 via the magnet 24.

Figure 7:
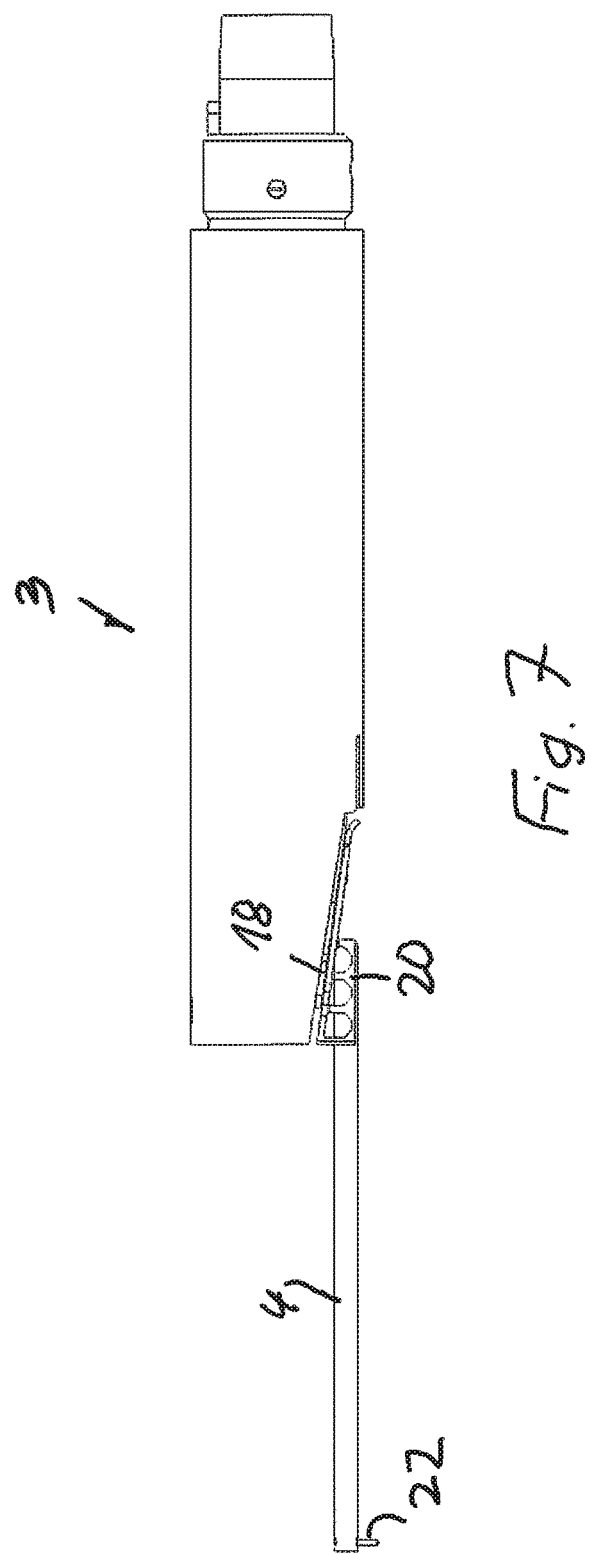
FIG. 7 shows a side view of the probe arm in the installed position.

According to the invention, at least one alignment protrusion is provided on the first part 18 as an installation alignment aid, which in the installed position of the probe arm 4 contactlessly or essentially contactlessly engages in an alignment recess that is formed on the second part. In the illustrated embodiment, the installation alignment aid is designed in such a way that an alignment of the probe arm 4 with respect to its longitudinal center plane is achieved during the installation of the probe arm 4. In FIG. 7, the longitudinal center plane of the probe arm 4 extends in parallel to the plane of the drawing and through the diameter of the probe arm 4.

In the illustrated embodiment, two alignment protrusions 42, 44, spaced apart from one another in the longitudinal direction, are provided (see FIG. 2), and in the illustrated embodiment are formed by alignment balls. The alignment balls 42, 44 are designed as separate components and are inserted into the surface 32 of the first part 18.

In the illustrated embodiment, the diameter of the alignment balls 42, 44 is larger than the diameter of the support balls 26, 28, 30, so that the alignment balls 42, 44 project farther beyond the surface 42 than do the support balls 26, 28, 30 (see FIG. 2).

Alignment recesses 46, 48 are provided on the second part 20 (see FIG. 3), corresponding to the arrangement of the alignment balls 42, 44 on the first part 18. The alignment balls 42, 44 are situated on the longitudinal axis of the first part 18, while the alignment recesses 46, 48 are situated on the longitudinal axis of the second part 20, and thus, of the probe arm 4. Accordingly, in the installed position of the probe arm 4 the longitudinal axis of the probe arm is aligned with the longitudinal axis of the first part 18 in the desired manner.

During installation of the probe arm 4, the surface 34 of the second part 20 (see FIG. 3) is brought toward the surface 32 of the first part 18 (see FIG. 1), the alignment balls 42, 44 initially moving into the associated alignment recesses 46, 48. In this way, precentering with respect to the longitudinal axis or longitudinal center plane of the probe arm 4 is achieved during the installation of the probe arm 4. As the part 20 further approaches the part 18, the support balls 26, 28, 30 come into engagement with the support recesses 36, 38, 40, the second part 20 being held to the first part 18 by the magnet 24. The alignment balls 42, 44 are contactlessly accommodated in the recesses 46, 48 in the installed position of the probe arm 4, so that the first part 18 and the second part 20 are connected to one another with static determinacy via the support balls 26, 28, 30 and the support recesses 36, 38, 40 in the desired manner.

Figure 4:
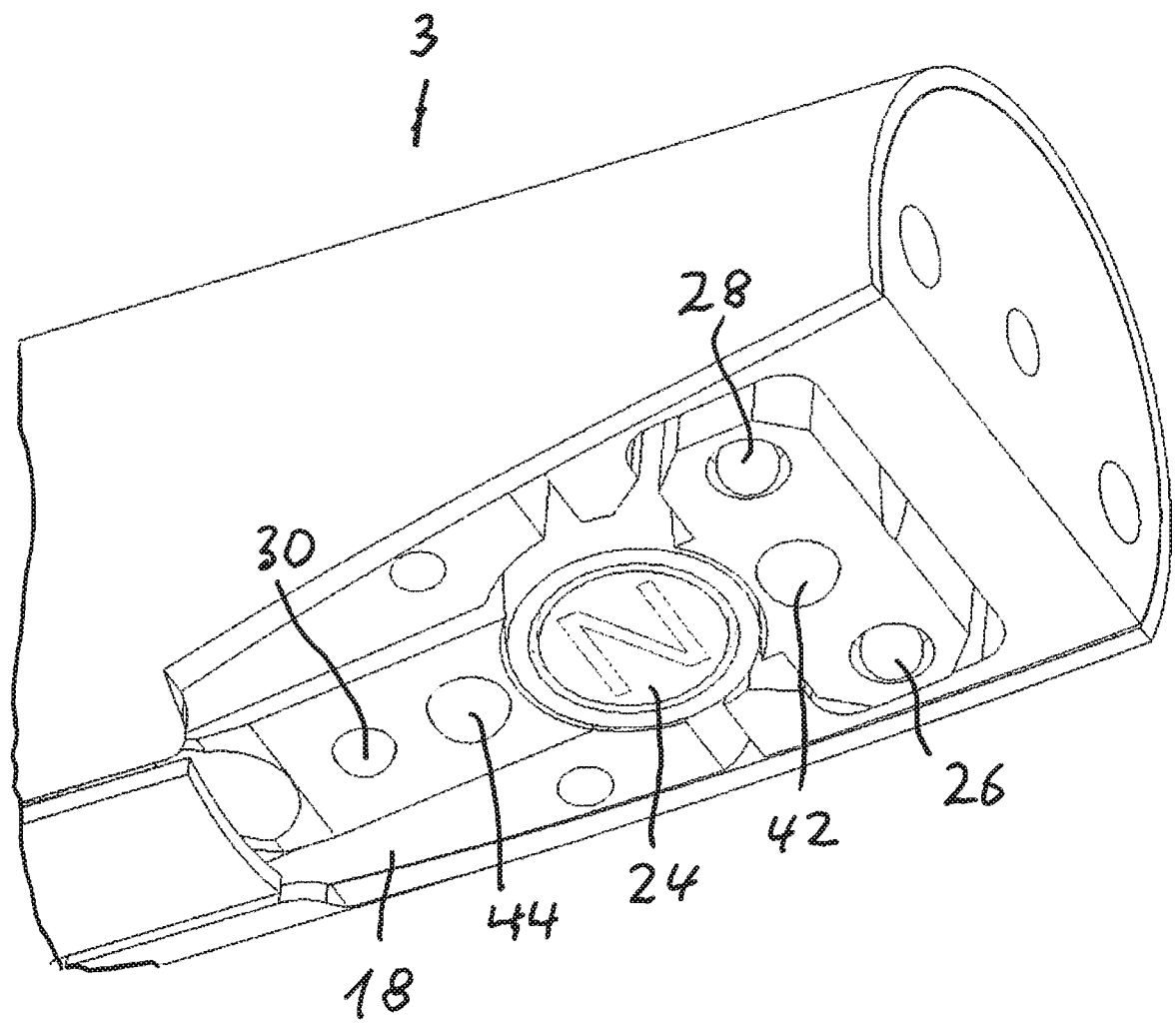
FIG. 4 shows the first part of the interface in enlarged scale compared to FIG. 2.
Figure 5:
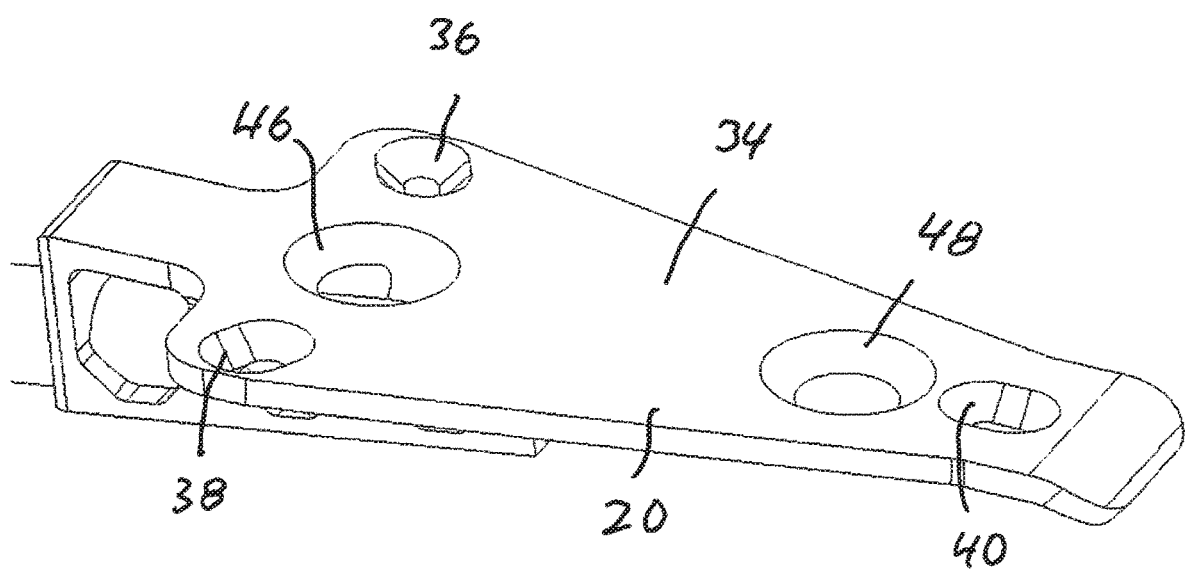
FIG. 5 shows the second part of the interface in enlarged scale compared to FIG. 3.

FIGS. 4 and 5 show the first part 18 and the second part 20 in enlarged scale compared to FIGS. 2 and 3.

Figure 6:
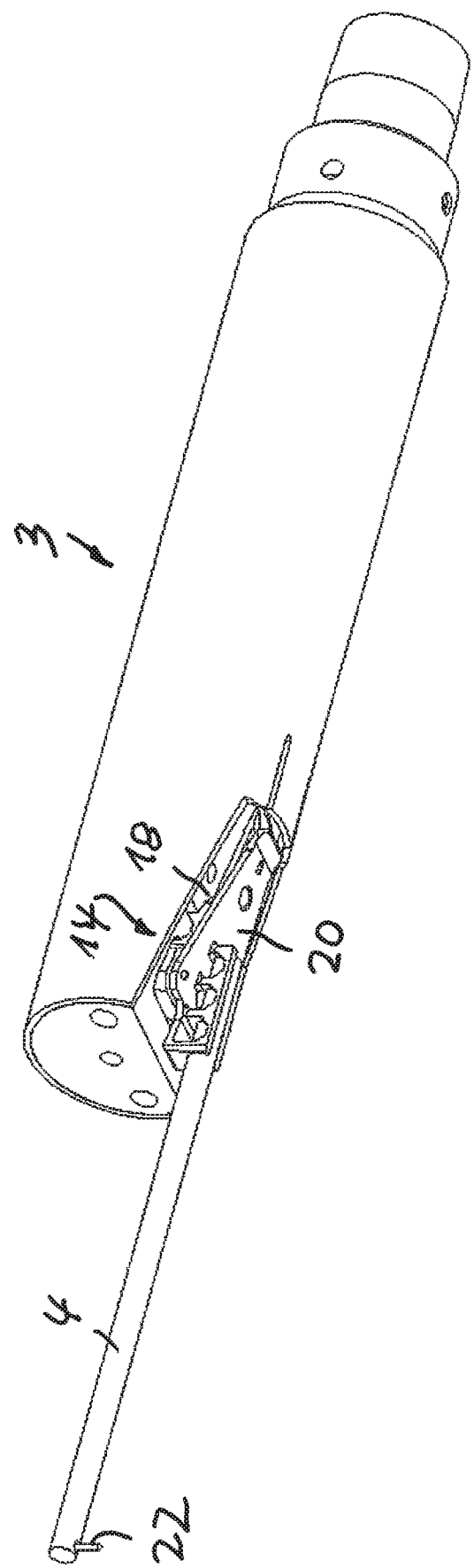
FIG. 6 shows a perspective view of the probe arm in the installed position.

FIGS. 6 and 7 show the probe arm 4 in its installed position in a perspective view and a side view, respectively.

The invention reliably prevents misalignments during installation of the probe arm 4, thus reliably avoiding measuring errors or impairments of the measuring accuracy caused thereby. The invention thus increases the functional reliability of surface measuring apparatuses, using very simple and economical means.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A surface measuring apparatus for measuring a surface of a workpiece, comprising:
   a) a probe that includes a probe arm bearing a probe element for contacting the surface of a workpiece to be measured;
   b) a feed apparatus for moving the probe element relative to the workpiece to be measured;
   c) the probe arm is detachably connectable or connected to a movable part of the feed apparatus via a mechanical interface;
   d) the interface has a first part and a second part which in the installed position of the probe arm are connected to one another with static determinacy on the movable part of the feed apparatus;
   e) one of the first and second parts is associated with the probe arm and the other part is associated with the feed apparatus; and
   f) at least one alignment protrusion is provided on the first part as an installation alignment aid, which in the installed position of the probe arm contactlessly or essentially contactlessly engages in an alignment recess that is formed on the second part.

2. The surface measuring apparatus according to claim 1, wherein:
   a) the installation alignment aid is designed in such a way that an alignment of the probe arm with respect to its longitudinal center plane is achieved during installation of the probe arm.

3. The surface measuring apparatus according to claim 1, wherein:

a) the first part and the second part are connected to one another in the installed position of the probe arm via a three-point support.

4. The surface measuring apparatus according to claim 3, wherein:
- a) in the installed position of the probe arm, the three-point support is formed on mutually facing surfaces of the first part and of the second part, and on one of the parts has three support protrusions, which in the installed position of the probe arm make engaging contact with support recesses, having an essentially complementary shape, that are formed on the other part.

5. The surface measuring apparatus according to claim 4, wherein:
- a) at least one support protrusion is designed as a support ball.

6. The surface measuring apparatus according to claim 1, wherein:
- a) at least one alignment protrusion is situated in the longitudinal center plane of the first part or of the second part.

7. The surface measuring apparatus according to claim 6, wherein:
- a) at least two alignment protrusions, spaced apart from one another in the longitudinal direction of the probe arm, are provided.

8. The surface measuring apparatus according to claim 1, wherein:
- a) at least one alignment protrusion projects farther beyond the associated surface of the first part or second part than do the support protrusions, in such a way that as the first part approaches the second part during the installation of the probe arm, the alignment protrusion or the alignment protrusions comes(s) into engagement with the associated alignment recess before the support protrusions come into engagement with the associated support recesses.

9. The surface measuring apparatus according to claim 1, wherein:
- a) at least one alignment protrusion is designed as an alignment ball, and at least one support protrusion is designed as a support ball, and the diameter of the or each alignment ball is larger than the diameter of the or each support ball.

10. The surface measuring apparatus according to claim 1, wherein:
- a) the first part is connected to the movable part of the feed apparatus, and the second part is connected to the probe arm.

11. The surface measuring apparatus according to claim 1, wherein:
- a) in the installed position, the probe arm is held on the movable part of the feed apparatus by magnetic force.

12. The surface measuring apparatus according to claim 1, wherein:
- a) the probe arm in the installed position is held suspended on the movable part of the feed apparatus.

13. The surface measuring apparatus according to claim 1, wherein:
- a) the surface measuring apparatus is designed as a roughness measurement apparatus.

\* \* \* \* \*